(12) United States Patent
Abe et al.

(10) Patent No.: US 6,915,968 B2
(45) Date of Patent: Jul. 12, 2005

(54) FUEL INJECTOR

(75) Inventors: Motoyuki Abe, Chiyoda (JP); Yoshio Okamoto, Minori (JP); Makoto Yamakado, Tsuchiura (JP); Tohru Ishikawa, Kitaibaraki (JP); Shuichi Shimizu, Oarai (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 88 days.

(21) Appl. No.: 10/339,413

(22) Filed: Jan. 10, 2003

(65) Prior Publication Data
US 2003/0155449 A1 Aug. 21, 2003

(30) Foreign Application Priority Data
Feb. 7, 2002 (JP) .......................... 2002-030229
Aug. 7, 2002 (JP) .......................... 2002-229376

(51) Int. Cl.[7] .................... R05R 1/30; F02M 59/00; F02M 39/00
(52) U.S. Cl. .................... 239/585.1; 239/585.3; 239/585.4; 239/585.5; 239/533.2; 239/533.3
(58) Field of Search .................... 239/585.1–585.5, 239/533.2, 533.3, 533.9, 533.12, 463, 476, 482, 487, 88–93; 251/127, 129.15, 129.21

(56) References Cited

U.S. PATENT DOCUMENTS

| | | | | |
|---|---|---|---|---|
| 4,292,947 A | * | 10/1981 | Tanasawa et al. | 123/445 |
| 4,629,127 A | * | 12/1986 | Kawamura et al. | 239/489 |
| 4,646,974 A | * | 3/1987 | Sofianek et al. | 239/463 |
| 5,109,823 A | * | 5/1992 | Yokoyama et al. | 123/472 |
| 6,755,347 B1 | * | 6/2004 | Holz | 239/5 |

FOREIGN PATENT DOCUMENTS

| | | |
|---|---|---|
| JP | 8-42427 | 2/1996 |
| JP | 10-184496 | 7/1998 |
| JP | 10-184498 | 7/1998 |

* cited by examiner

Primary Examiner—Davis Hwu
(74) Attorney, Agent, or Firm—Antonelli, Terry, Stout & Kraus, LLP

(57) ABSTRACT

To enable the inclination of the injection direction and the distribution of the penetration force of spray to be adjusted over a wide range, and an axially symmetrical spray shape to be obtained even when the injection hole is inclined, or the shape of the spray to be changed without inclining the injection hole, a fuel passageway 203 is provided as a swirling force adjustment means between the valve seat 201 and injection hole 101 of the fuel injector. This swirling force adjustment means adjusts the distribution of the swirling force of the fuel flowing into injection hole 101, and thus adjusts the spray shape obtained as a result.

18 Claims, 7 Drawing Sheets

FUEL INJECTOR

BACKGROUND OF THE INVENTION

The present invention relates to fuel injectors of the type used in an internal combustion engine.

Japanese Application Patent Laid-Open Publication No. Hei 08-42427 discloses a fuel injector for an internal combustion engine, in which a valve member slidable in its axial direction is provided inside a body having a cross-sectionally round injection hole as an open end. A swirling force generating means for imparting a swirling component to fuel is disposed between the outer surface of the valve member and the inner surface of the body. The base end portion of the injection hole is open on the axial center line of the injector, but the open edge of the front open end of the injection hole is not disposed along a plane orthogonal to the center line of the injection hole. More specifically, the open edge of the front open end of the injection hole in the fuel injector is disposed along a plane that is inclined with respect to the center line of the injection hole. In this fuel injector, the center line of the fuel spray spreading in approximately a conical form, namely, the direction of the spray, is inclined with respect to the center line of the injection hole, and does not extend along the center line.

Japanese Application Patent Laid-Open Publication No. Hei 10-184496 discloses a fuel injector wherein a fuel injection chamber that is opened and closed by a needle valve is formed at the front end of a valve body containing a needle valve. An injection hole is formed obliquely at the bottom of the fuel injection chamber, and the fuel pumped into the valve body, when the needle valve opens, is supplied spirally to the inside of the fuel injection chamber and is injected from the injection hole. The fuel injector has a unidirectional-offset suppression means by which the unidirectional offset of the velocity distribution of the fuel flowing into the injection hole, in the axial direction of the injection hole, is suppressed.

More specifically, the slope of the inclined surface from the fuel injection chamber to the injection hole is set so as to change according to the particular circumferential position of the injection hole. Even more specifically, the inner lower surface of the fuel injection chamber is formed into a semi-spherical shape, and the position of the injection hole is offset in a direction such that it is rotated through 90 degrees with respect to the swirling direction of the fuel from the direction of inclination of the injection hole. In this fuel injector, the spray status of the fuel injected from the outlet of the injection hole is homogenized by the unification of the axial velocity distribution of the fuel inside the injection hole.

The above-described technology presents a method of changing the shape of the spray produced by a fuel injector. For an in-cylinder direct injection-type gasoline engine (hereinafter, referred to as a direct injection engine), in particular, the spray of fuel that has been formed into an appropriate shape, depending on the combustion scheme, the shape of the combustion chamber, the dimensions thereof, and other factors, and the value of the corresponding fuel injector is great.

However, for the fuel injector disclosed in Japanese Application Patent Laid-Open Publication No. Hei 0842427, since the angle of inclination of the fuel injection direction has a correlation with the spray angle of the injected fuel, the degree of freedom in the formation of the injection direction and spray angle of the fuel is never high. For example, there is a problem in that the inclination of the fuel injection direction also causes an offset in the concentration distribution of the fuel, and the desired spray is not easy to obtain.

For the fuel injector disclosed in Japanese Application Patent Laid-Open Publication No. Hei 10-184496, the injection hole has a function that determines the injection direction of the fuel, in addition to a function that measures the injection volume. Therefore, there is a problem in that the decentering of the injection hole changes the volume of the fuel injection. That is to say, since the injection hole is provided in eccentric form in the semi-spherical fuel injection chamber, the area and shape of the section ranging from the fuel injection chamber to the injection hole will change according to the amount of eccentricity thereof, and these factors affect the flow rate of the fuel. Conversely, if the diameter of the injection hole is changed to compensate for a change in injection volume, the amount of eccentricity of the injection hole will also change, which will make it difficult to obtain both the desired injection volume and spray shape.

In addition, it is not easy to provide an inclined injection hole in a curved fuel injection chamber by simply piercing, in eccentric form, the member constituting the injection hole, or to provide a member that has an inclined and eccentric injection hole, with curved-surface machining appropriate for the fuel injection chamber; and so, the use of these machining processes causes an increase in cost when the fuel injector is to be manufactured by mass production.

SUMMARY OF THE INVENTION

The object of the present invention is to provide a fuel injector that enables the injection direction of fuel and the shape of its spray to be easily adjusted.

In the fuel injector according to the present invention, in order to satisfy the above-stated object, a swirling force adjustment means for adjusting the distribution of the swirling force of swirled fuel in its swirling direction is provided downstream with respect to the contact portion (seat portion) between the valve member and the valve seat of the injector, and upstream with respect to the injection hole. The desired shape of the spray can be obtained by adjusting the distribution of the swirling force of the fuel flowing into the injection hole.

It is also possible, by providing, at the upstream side of the swirling force adjustment means, an injection volume measuring portion which functions as a fuel passageway whose cross-sectional area is the smallest of all other sections, and so it is easy to adjust the spray shape.

A further object of the present invention is to supply a fuel injector that enables the injection direction of fuel and the shape of its spray to be adjusted.

In a fuel injector that has an injection hole for injecting fuel and which imparts a swirling force to the fuel from the upstream side of the injection hole, a valve seat, a valve member for opening and closing a fuel passageway between the injection hole and the valve seat, and a means for driving the valve member, a swirling force adjustment means for adjusting the swirling force that has been imparted by said swirling force impartment means is provided in the fuel passageway and ranges from the valve seat to the injection hole. The use of the swirling force impartment means enables the desired spray shape to be obtained by adjusting the swirling force of the fuel flowing into the injection hole.

Also, the shape of the swirling force impartment means can be simplified by constructing this swirling force impartment means so that the member having the above-mentioned injection hole and the member having the above-mentioned valve seat are formed as independent members.

In addition, it is possible, by providing, at the upstream side of the swirling force adjustment means, an injection volume measuring portion which functions as a fuel passageway whose cross-sectional area is the smallest of all other sections', to independently adjust both the spray shape of the fuel and the volume of injection thereof, so that it is easy to adjust the spray shape.

DESCRIPTION OF THE INVENTION

Figure 1:
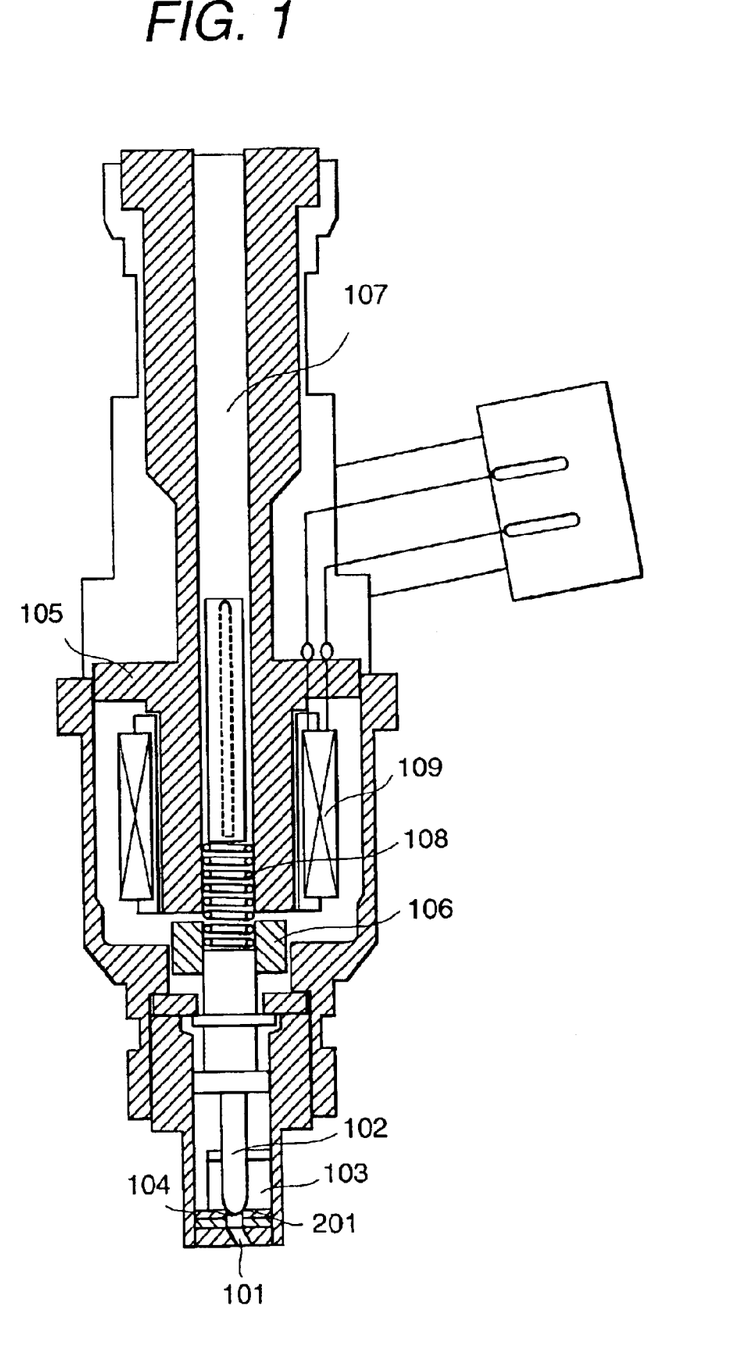
FIG. 1 is a cross-sectional view showing an embodiment of the fuel injector according to the present invention.

FIG. 1 is a cross-sectional view showing the structure of a fuel injector in accordance with an embodiment of the present invention. The fuel injector shown in FIG. 1 is a normally closed type of fuel injector, wherein, when a coil 109 is not energized, a valve member 102 is in firm contact with a valve seat 201 to prevent the flow of fuel therethrough. Fuel is supplied from a fuel supply port under pressure which is imparted by a fuel pump (not shown in the figure), and the section from a fuel passageway 107 to the point of firm contact between the valve member 102 and the valve seat 201 is filled with fuel. When the coil 109 is energized and valve member 102 is moved away from the valve seat 201 by the longitudinal displacement of the valve member 102, the fuel will be injected through an injection hole 101. Since the fuel is passed to the injection hole 101 through the swirling grooves of a swirling element 103 at that time, a swirling force is imparted to the fuel during its passage along the swirling grooves of the swirling element 103, and the fuel is injected from injection hole 101 while swirling.

Figure 2:
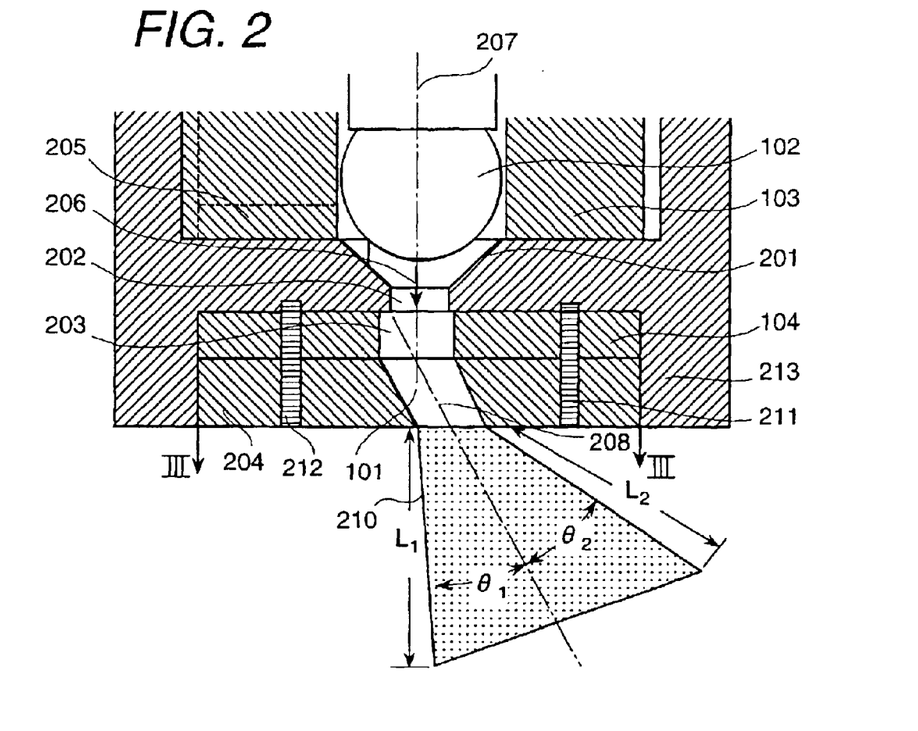
FIG. 2 is an enlarged cross-sectional view showing the vicinity of the injection hole in an embodiment of the fuel injector according to the present invention as seen along a line II—II in FIG. 3.

FIG. 2 is an enlarged cross-sectional view showing the vicinity of the downstream end of the valve member 102 and the valve seat 201 of the fuel injector shown in FIG. 1. After the valve member 102 has undergone displacement so as to separate from the valve seat 201, the fuel flows out from the clearance occurring between the valve member 102 and the valve seat 201. Swirling force is imparted to the fuel by the fuel passageway 205 within the swirling element, and it then flows through the clearance between the valve body 102 and the valve seat 201, while swirling around the axis 207 of the valve member that is axially aligned with the swirling element, and reaches the injection volume measuring portion 202.

The injection volume measuring portion 202, which functions as a fuel passageway, has a cross-sectional area that is smaller than that of any other fuel passageway located downstream with respect to the injection volume measuring portion 202. For this reason, the outflow rate of the fuel per unit time can be adjusted according to the particular cross-sectional area and length of the injection volume measuring portion 202. Also, since the pressure loss of the fuel becomes a maximum at the injection volume measuring portion 202, pressure losses at a swirling force adjustment element 104 provided downstream with respect to the injection volume measuring portion 202, and at the fuel passageway 203 and injection hole 101 provided in an injection hole plate 204, are reduced. For this reason, the force applied to the swirling force adjustment element 104 and the injection hole plate 104 by the fuel pressure is reduced, and the strength required for these components, which are to be held in a nozzle holder 213, can be minimized.

The fuel that has passed through the injection volume measuring portion 202 is routed through the fuel passageway 203 that is provided in the swirling force adjustment element 104, and it then arrives at the injection hole 101 that is provided in the injection hole plate 104. The axis 208 of the injection hole 101 is inclined with respect to the axis 207 of the valve member 102. The fuel passageway 203 functions as a swirling force adjustment section, and it is constructed so that the distribution of the swirling force of the fuel in the swirling direction thereof (namely, the circumferential direction of the fuel passageway 203) during passage through the injection hole 101 can be adjusted. That is to say, the fuel passageway 203 is provided so as to change the distribution of the swirling force of the fuel. In the example of FIG. 2, the fuel passageway 203 is installed so that an almost axially symmetrical swirling force with respect to the axis 208 of the injection hole 101 occurs therein. The spray 210 from the injection hole 101 can be formed into an almost axially symmetrical shape by adjusting the swirling force within the injection hole 101. That is to say, the spray angles θ1 and θ2 of the fuel injected to both sides of the central axis 209 of the spray become almost equal. Also, the spray shape becomes axially symmetrical, and the spray travels L1 and L2 become equal.

The center here is positioned at the center of gravity of the cross section, and the central axis or center line is an axis or line passing through this center and is transverse to the cross section.

Figure 3:
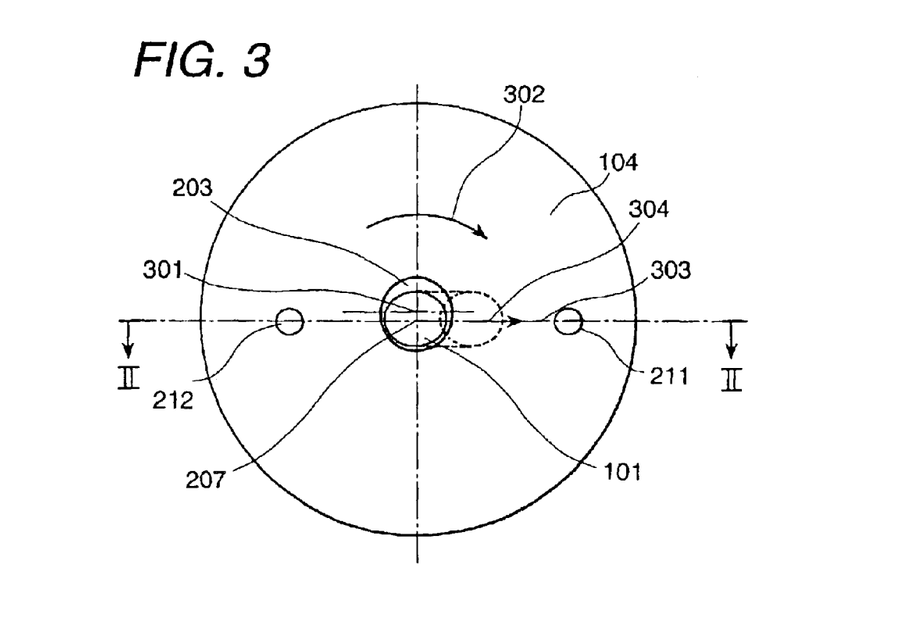
FIG. 3 is a sectional view showing the vicinity of the injection hole and fuel passageway in the fuel injector of FIG. 2 as seen along a line III—III in FIG. 2.

FIG. 3 is an enlarged view showing the structure of the fuel passageway 203 functioning as a swirling force adjustment section, and it is also a view of the swirling force adjustment element 104 as seen in cross-section along a line III—III in FIG. 2. FIG. 2 is a cross-sectional view as seen along a line II—II in FIG. 3.

The central axis 208 of the injection hole 101 is inclined with respect to the axis 207 of the valve member 102, and so the injection hole 101 is shown as in dashed line in FIG. 3. The central axis 208 of the injection hole 101 is provided so as to intersect with the axis 207 of the valve member 102 at the surface of the opening of the inlet of the injection hole 101.

The central axis of the fuel passageway 203, which is located in swirling force adjustment element 104, is provided at a position 301 that is decentered by an angle of 90 degrees with respect to a line segment 303, in the opposite rotational direction to the swirling direction 302 of the fuel. The line segment 303 is a segment created by projecting the center line 208 of the injection hole 101 onto the paper surface of FIG. 3, that is perpendicular to the axial center 207 of the valve member 102. Fixing pins 211 and 212 are used to position and fix the swirling force adjustment element 104 and the injection hole plate 204. Fixing pins do not always need to be used to fix these is elements. The two elements can be fixed by welding, provided that the positioning accuracy can be improved during the welding process associated with the assembly of the fuel injector.

In the present embodiment, from the upstream side of the fuel passageway, in sequential order, a seat portion 201, a first chamber 203 (passageway portion) serving as the fuel passageway for adjusting the distribution of the swirling force, and injection hole 101 are provided in the axial direction of the valve member 102. It is preferable that, as in the present embodiment, a second chamber (passageway portion), serving as injection volume measuring portion 202, should also be provided upstream with respect to the first chamber 203 and downstream with respect to the seat portion 201. The cross-section vertical to the center lines of each of the seat portion 201, the first chamber 203, and the second chamber 202, is circularly formed, while the central axis of the second chamber 202 is aligned with the axial center 207, and the center of the inlet edge of the injection hole 101 is present on an extension of the axial center line 207. Also, although the central axis of the first chamber 203 is parallel to the axial center 207, this central axis is offset from axial center 207, at progressively deeper positions of the paper surface in FIG. 2. In addition, the cross-sectional areas of the seat portion 201, second chamber 202, first chamber 203, and injection hole 101, are maintained in a relationship such that the second chamber 202 is the smallest and the first chamber 203 is larger than the injection hole 101.

Figure 4:
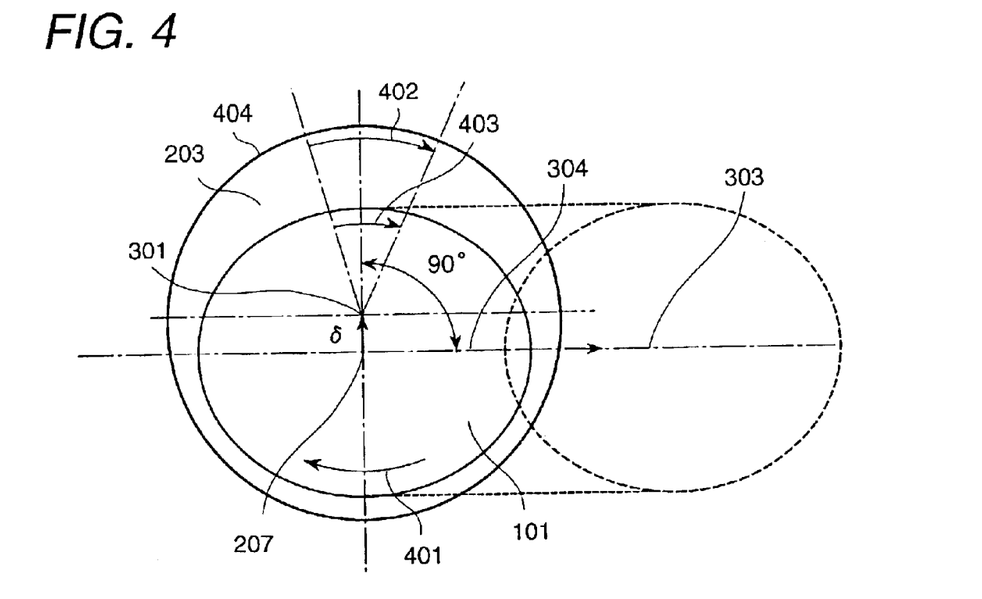
FIG. 4 is a further enlarged diagrammatic view of the fuel passageway and injection hole shown in FIG. 3.

FIG. 4 is a further enlarged view showing the vicinity of the fuel passageway 203 shown in FIG. 3, and it is also a view schematically illustrating the way the swirling force of the fuel in the injection hole 101 is adjusted. The fuel flowing in from an upstream section swirls in the direction of the arrows 401 to 403. Before flowing into fuel passageway 203, however, the fuel swirls around the axis 207 of the valve member 102. The central axis of the fuel passageway 203 is eccentric with respect to a position 301, and the center 301 of the fuel passageway 203 is provided at a position offset through a clearance of δ from segment 303, at the section where the fuel passageway 203 and the injection hole 101 are connected. For this reason, the swirling center of the fuel flowing into the fuel passageway 203 is also formed near the central axis of the fuel passageway routed through point 301. Accordingly, the swirling force of the fuel flowing into injection hole 101 is distributed as indicated by arrows 401 and 403, with the result that the velocity in the swirling direction at the point where the arrow 401 is shown increases and the velocity in the swirling direction at the point where the arrow 403 is shown decreases. In this way, it is possible to adjust the distribution of the swirling force of the fuel flowing into injection hole 101.

In the example of FIG. 2, since the central axis 208 of the injection hole 101 is inclined with respect to the axial center 207 of the valve member 102, the swirling force adjustment means shown in FIG. 3 creates the effect that the axial symmetry of the swirling force in the injection hole 101 with respect to the axis 208 thereof is enhanced. This effect is brought about by the fact that, as seen in FIG. 4, the arrows 401 and 403 indicating the velocities of fuel in the swirling direction, when the fuel flows into injection hole 101, differ in magnitude. The corresponding principles are described below.

Injection hole 101 is inclined, and fuel flows through the injection hole 101 towards the right side as seen in FIG. 4. At this time, since the flow direction of the fuel at the position of arrow 401 is opposite to the fuel swirling direction, the swirling force of the fuel is reduced at the section where it flows into injection hole 101. Conversely, since the flow direction of the fuel at the position of arrow 403 is the same as the fuel swirling direction, the swirling force of the fuel is increased at the section where it flows into injection hole 101. For these reasons, the velocity 403 of the fuel flowing in the swirling direction where swirling force has been reduced by the fuel passageway 203, that is provided as a swirling force adjustment means, is increased by the inclination of the injection hole 101; and, conversely, the velocity of the fuel flowing in the swirling direction whose swirling force has been increased by fuel passageway 203 is reduced by the inclination of the injection hole 101, so that the two velocities have the relationship that both cancel one another.

Since the swirling force adjustment means is provided so that the inequality of the swirling force generated inside injection hole 101 by the inclination is canceled in this way, it is possible to obtain the effect that the swirling force of the fuel in the injection hole can be enhanced in axial symmetry with respect to the axis 207 of the injection hole. Accordingly, the shape of the spray obtained (namely, the fuel spray travel and the like) can be made almost axially symmetrical.

Figure 5:
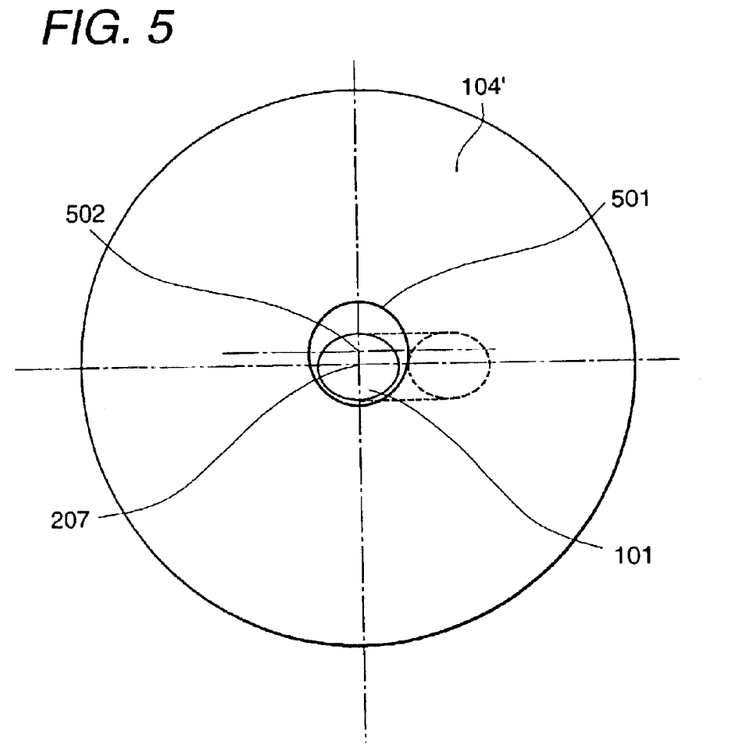
FIG. 5 is a diagram showing an example of a fuel passageway which can create an effect equivalent to that obtained from the formation of the fuel passageway shown in FIG. 4.

An effect similar to that set forth above can also be obtained by using a fuel passageway 501 having a shape such as shown in FIG. 5. The fuel passageway 501 has an elliptic shape, and its center is located at a center 502. In fuel passageway 501, therefore, the center of the swirling force is formed near the center 502 and an effect close to that achieved when the eccentric circle shown in FIG. 4 is provided can be obtained.

For such an elliptic shape as shown in FIG. 5, there is the characteristic that the volume of the fuel passageway 501 can be made smaller than that of the fuel passageway 203. This characteristic, in turn, makes it easier to reduce the volume of the fuel passageway located downstream with respect to the firm contact position (seat position) between the valve member and the valve seat, thus reducing the amount of unswirled fuel injected initially during the start of the injection. Among all factors relating to the shape of the spray from the fuel injector, only the amount of fuel distributed in the center of its spray and the penetration force of the spray are affected by the amount of unswirled fuel injected initially during the start of the injection. For this reason, although it is desirable that the amount of fuel injected initially during the start of the injection should be changeable according to requirements, the use of a fuel passageway having a shape such as shown in FIG. 5 enables the amount of unswirled fuel to be reduced, while adjusting the swirling force in the injection hole 101, even when the need arises to reduce the amount of unswirled fuel. Conversely, to increase the amount of unswirled fuel, it is preferable that the diameter of the fuel passageway 203 shown in FIG. 4 should be increased or that the length of the fuel passageway 203 in the direction of its axis 207 should be increased.

Since the fuel passageways 203 and 501 to be provided in the swirling force adjustment elements 104 and 104', respectively, can be formed simply by piercing a plate-like member in a vertical direction, the fuel injector according to the present invention can be easily manufactured. Therefore, it is possible, by modifying the shapes and positions of the fuel passageways 203 and 501 in an appropriate member, to obtain a desired spray shape, while minimizing increases in the costs required for special machining technology and for the manufacture of the fuel injector.

It also becomes possible, by providing, in this way, the swirling force adjustment element 104 downstream with respect to the injection volume measuring portion 202, to minimize the influence on the volume of injection, while at the same time easily adjusting the swirling force of the fuel flowing into injection hole 101.

Figure 8:
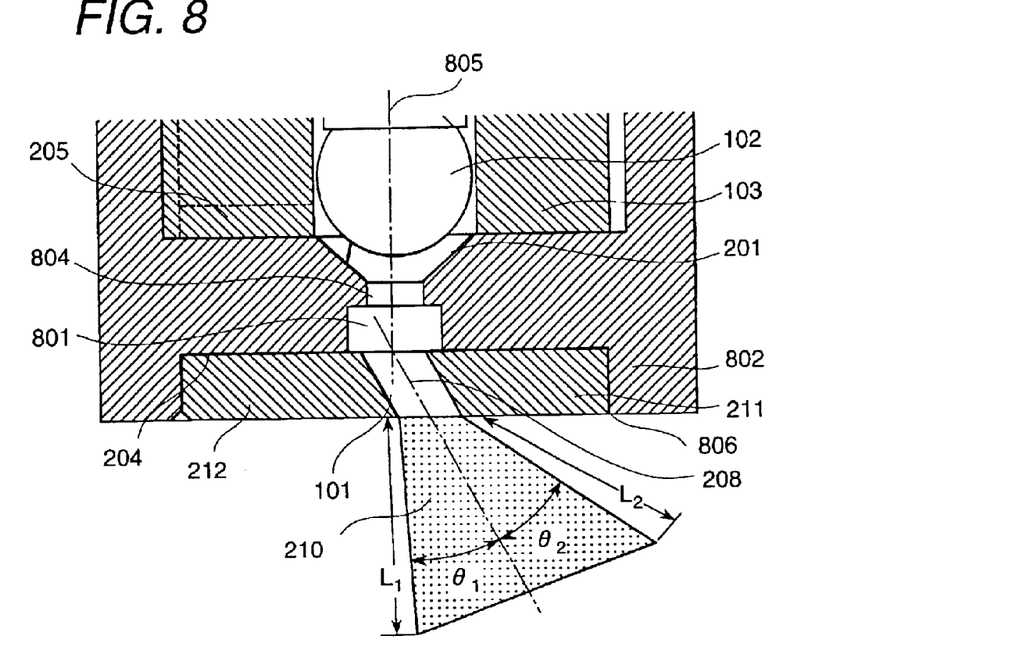
FIG. 8 is a cross-sectional view showing an embodiment of the present invention in which a swirling force adjustment means is provided as a recess in the same member as that having a fuel passageway at the upstream side of the corresponding swirling force adjustment means.

As a method of providing a swirling force adjustment means, a recess, such as a swirling force adjustment channel 801, can be formed downstream of an injection volume measuring portion 804 provided in a nozzle holder 802, as shown in FIG. 8. In FIG. 8, an injection hole plate 805 with an injection hole, that fits into the nozzle holder 802 having the swirling force adjustment channel 801, is welded at the position of a weld 806.

The shapes of the swirling force adjustment channel 801, the injection volume measuring portion 804, and injection hole 101, and the relationship in position between them are the same as the shapes of the injection volume measuring portion 202, fuel passageway 203, and injection hole 101 of FIG. 2, and there is the same relationship in position between these three portions.

The number of components required can be reduced by providing the swirling force adjustment channel 801 in the same member as that of the nozzle holder 802. In addition, the relationship in position between the injection volume measuring portion 804 and the swirling force adjustment channel 801 is determined only by the machining accuracy of the injection volume measuring portion 804 provided in nozzle holder 802 and of the swirling force adjustment channel 801, and so assembly-associated errors in the positional relationship between these portions are removed, with the result that a symmetrical spray 210 with respect to the axis 209 of the fuel spray can be formed stably and easily.

Figure 9:
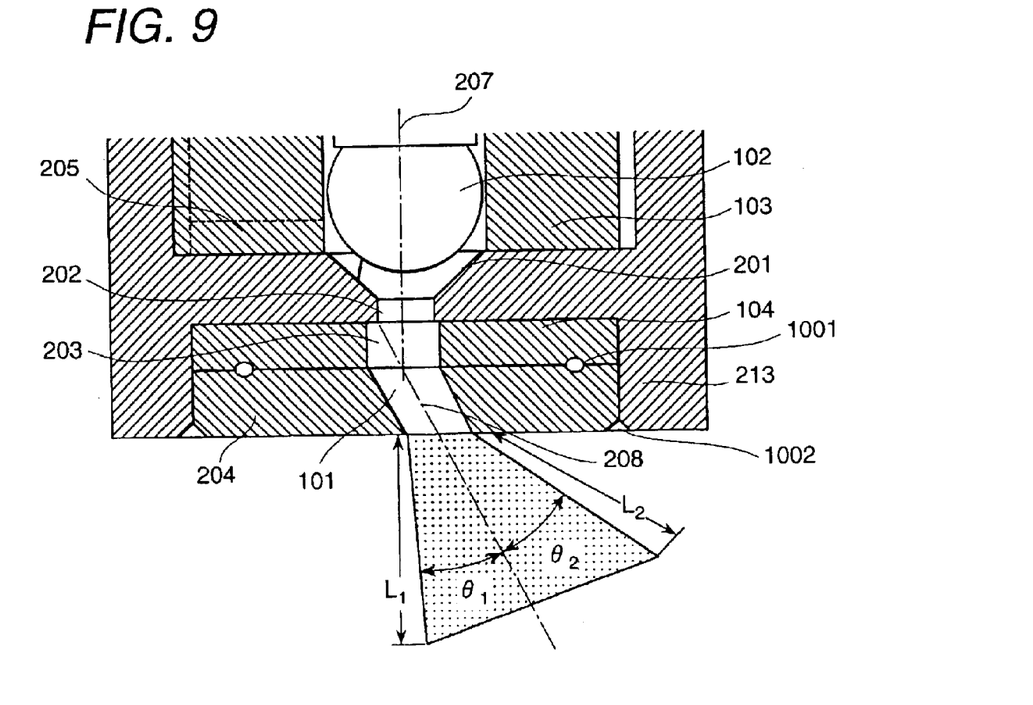
FIG. 9 is a cross-sectional view showing an embodiment of the present invention in which, after the member having a swirling force adjustment means and the member having an injection hole have been connected by welding, this welded assembly is connected to the member having an injection volume measuring portion.

As shown in FIG. 9, after swirling force adjustment element 104 and injection hole plate 204 have been spot-welded at a weld point 1001, this welded assembly can be fit into a nozzle holder 213 and then fixed at a weld point 1002 by welding.

Figure 10:
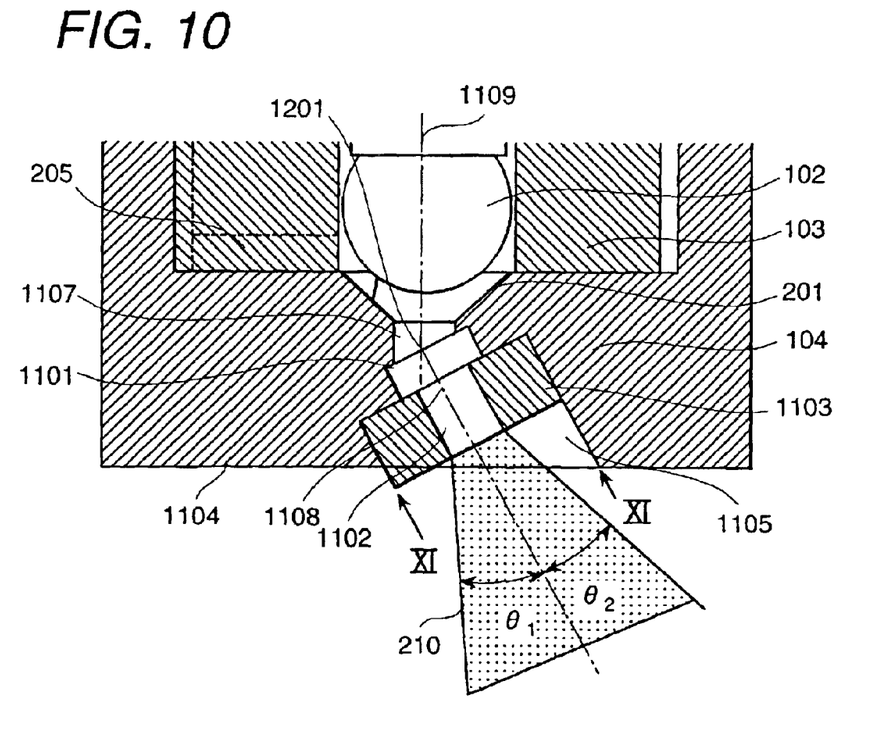
FIG. 10 is cross-sectional view showing an embodiment of the present invention in which there is an injection hole plate provided with an injection hole extending orthogonal to the surface of the member having the injection hole.

FIG. 10 shows an example in which a cylindrical guide portion 1105, that is disposed in parallel to an injection hole 1102, is provided on a nozzle holder 1104, and a swirling force adjustment channel 1101, that has been provided as a recess that is disposed approximately parallel to the above-mentioned guide portion 1105, upstream with respect to this guide portion, functions as a swirling force adjustment means.

Figure 11:
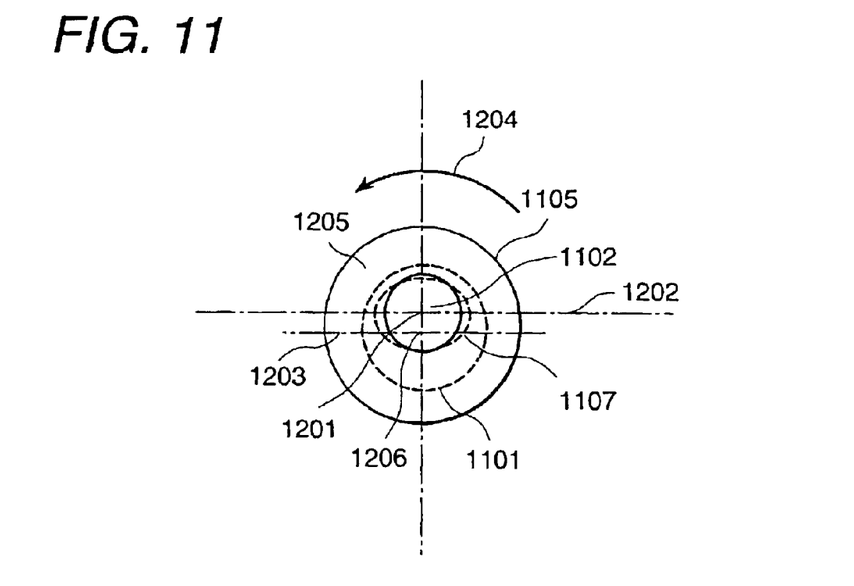
FIG. 11 is a sectional view showing the vicinity of the injection hole in the fuel injector of FIG. 10 as seen along a line XI—XI in FIG. 10.

FIG. 11 is an enlarged view of the vicinity of the injection hole 1102 and swirling force adjustment channel 1101 in the fuel injector shown in FIG. 10, showing a cross-sectional view taken along a line X1-XI in FIG. 10. In FIG. 11, fuel flows from the rear of the paper surface to the front. In FIG. 10, the center line 1108 of the injection hole 1102 intersects with the center line 1109 of an injection volume measuring portion 1107 at a point 1201, and as shown in FIG. 11, and this point 1201 aligns with the center of the open surface at the outlet side of the injection volume measuring portion 1107.

Also, the line 1202, as seen in FIG. 11, passes through the center 1201 of the injection hole, exists in the surface that encompasses center lines 1109 and 1108, and is orthogonal to center line 1108. In FIG. 11, swirling force adjustment channel 1101 is provided so that its center 1206 exists on the line 1203 that is shifted relative to line 1202. Hereby, the fuel injector can be constructed so that the distance between the center 1201 of the injection hole and the peripheral wall surfaces of the swirling force adjustment channel 1101 changes circumferentially around the center 1201 of the injection hole 1102, and so the swirling force adjustment channel 1101 can produce the effect that it adjusts the swirling force of the fuel flowing into injection hole 1102. The swirling force of the fuel flowing into injection hole 1102 is adjusted by swirling force adjustment channel 1101, so that a highly symmetrical spray can be created, as shown in FIG. 10.

In this way, by providing the nozzle holder with an inclined injection hole 1102 and a parallel guide portion 1105 that is parallel with respect to the axial center 207 of the valve body, it is possible to provide the injection hole 1102 by transversely piercing the surface of an injection hole plate 1103. Therefore, the injection hole 1102 can be easily machined, and its machining accuracy can be improved. Thus, it becomes easy to obtain a highly symmetrical and stable spray, while minimizing the costs required for the manufacture of the fuel injector.

In the present embodiment, the first chamber (passageway), serving as the fuel passageway 1101 for adjusting the distribution of the swirling force, is constructed so as to be inclined with respect to the axial center 207 of the valve body 102, whereas seat portion 201, the second chamber serving as injection volume measuring portion 202, the first chamber 1101, and injection hole 1102 are arranged side by side in the direction of the axial center 1109 of the valve body 102, with a relationship similar to that of the embodiment shown in FIG. 2.

Figure 6:
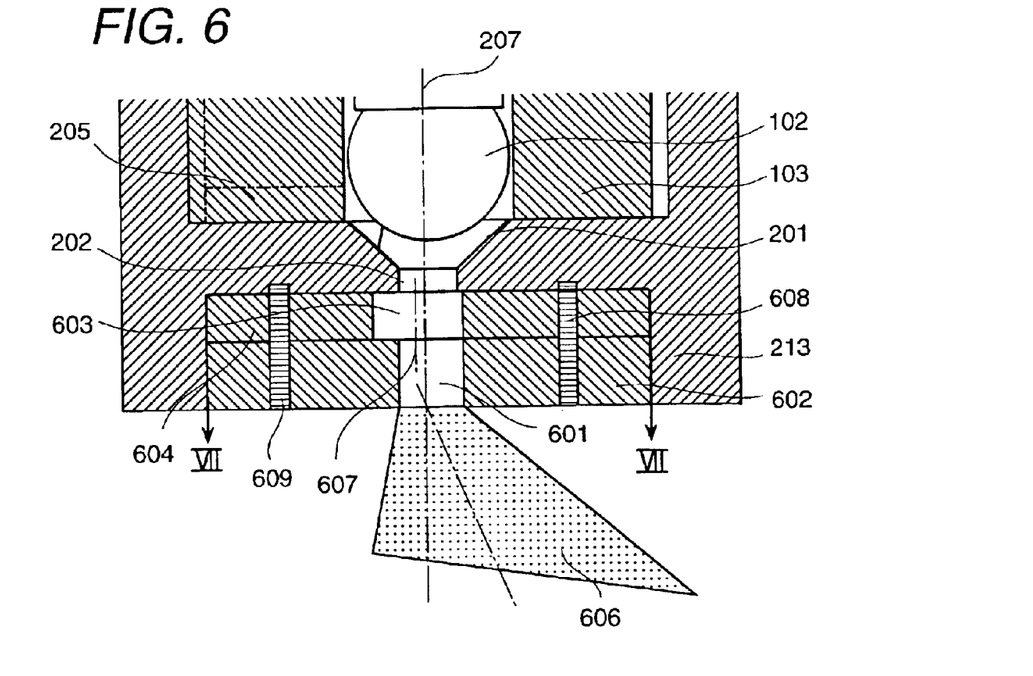
FIG. 6 is an enlarged cross-sectional view showing the vicinity of the injection hole in another embodiment of the fuel injector according to the present invention.

Other effects of the swirling force adjustment element will be described below with reference to FIG. 6. FIG. 6 is a cross-sectional view showing the vicinity of the injection hole in the fuel injector in enlarged form, wherein injection hole 601 is not inclined and its axis is aligned with the central axis of 207 of the valve member 102 and the swirling element 103.

Figure 7:
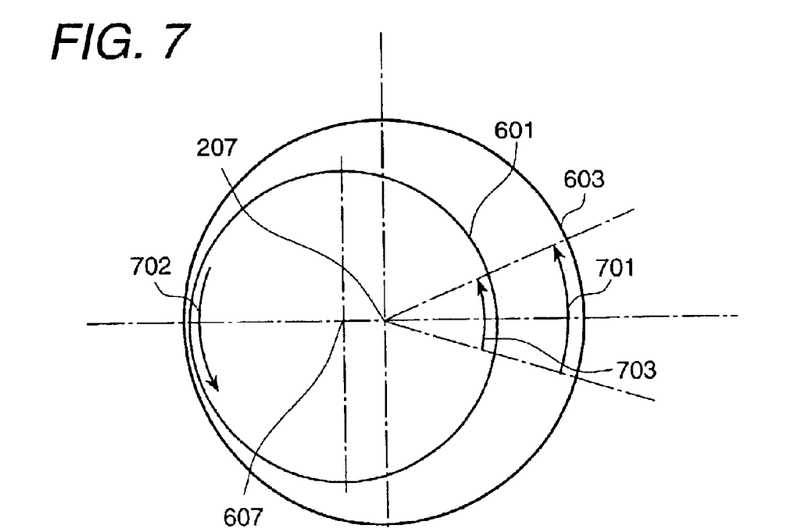
FIG. 7 is a sectional view showing the vicinity of the fuel passageway and injection hole in the fuel injector of FIG. 6 as seen along a line VII—VII in FIG. 6.

The central axis 607 of a fuel passageway 603 provided in a swirling force adjustment element 604 is provided eccentrically with respect to the axis 207 of valve member 102. In order to illustrate this effect, FIG. 7 shows, in enlarged form, the fuel passageway 603 and injection hole 101 when seen along line VII—VII in FIG. 6. The fuel that flows in while swirling, therefore, is routed through the fuel passageway 603 and flows into injection hole 601, while swirling around the vicinity of the central axis 607.

Since the fuel swirls around the central axis 607, the velocity of the fuel in its swirling direction decreases at the position indicated by an arrow 703 and increases at the position indicated by an arrow 702. For this reason, the area where the swirling force of the fuel flowing into injection hole 601 occurs is split into a section of weak swirling force and a section of strong swirling force.

In this way, by forming a section of weak swirling force and a section of strong swirling force in injection hole 601, it is possible to intentionally form, as shown in FIG. 6, a spray that is large in the angle of injection of the spray on one side and strong in penetration force, and small in the angle of injection of the spray on the other side and weak in penetration force.

The sections of the fuel having a strong swirling force and a weak swirling force that are created by the presence of the fuel passageway 603 arrive at the opening in the injection hole plate while swirling spirally inside the injection hole 101. The distribution of the intensity of the spray can be adjusted by changing the central position of the fuel passageway 603 in the circumferential direction of the central axes of the swirling element 103 and valve member 102. Also, the positions at which the angle of injection in the spray and the distribution of the intensity of its penetration force can be adjusted by changing the thickness "t1" of the injection hole plate shown in FIG. 6.

The above adjustments, in turn, enable the direction of the spray to be inclined without inclining the direction of the injection hole 601 or fuel passageway 603. Since injection hole 601 and fuel passageway 603 can be formed simply by transversely piercing independent plate-like members, it is possible to adjust the shape of the spray while minimizing any increase in the manufacturing costs.

Figure 12:
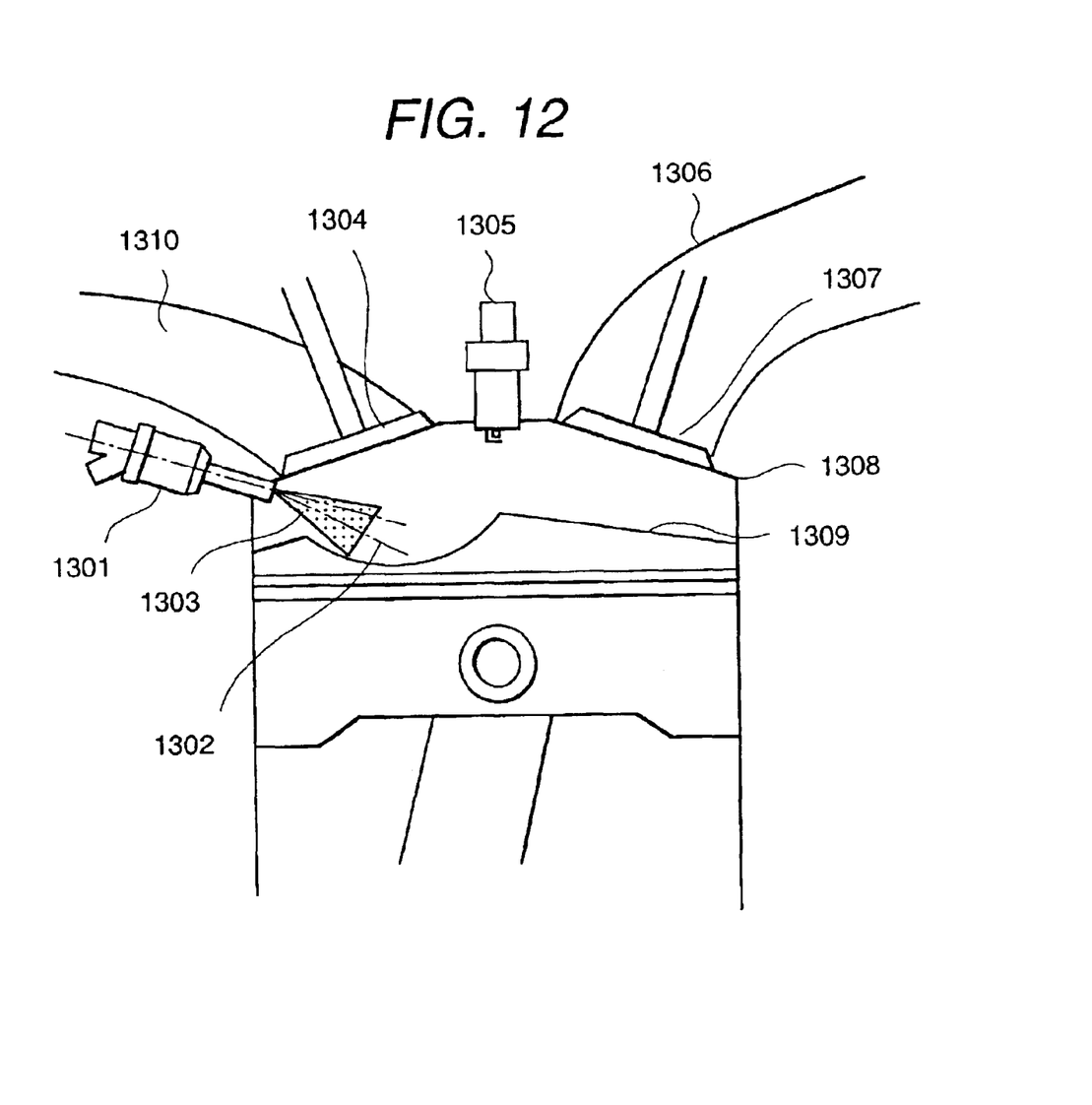
FIG. 12 is a schematic diagram showing the cross section of one cylinder of an internal combustion engine in which the fuel injector according to the present invention is mounted.

FIG. 12 is a cross-sectional view of one cylinder of an in-cylinder direct-injection-type gasoline engine in which the fuel injector according to the present invention is mounted. The engine shown in the figure has a structure where the mixture formed by the spray 1303 of the fuel which has been injected from the fuel injector 1301 during a compression stroke is guided to an ignition plug 1305 during the period up to ignition timing by use of a piston 1309 that is provided with a recess in the top surface thereof.

The fuel injector 1301 to be mounted in the engine shown in the figure is a fuel injector having structure near its injection hole such as shown in FIG. 2. The axis of the injection hole is inclined so as to face in the direction 1302 of piston 1309, rather than in the direction of the axis of the fuel injector 1301.

Before the mixture in the combustion chamber can be ignited, the mixture formed by the injected fuel spray 1303 must be carried to the ignition plug 1305, and then a mixture within a flammable air-to-fuel ratio range must be formed around the ignition plug 1305 at the ignition timing. There is a need, therefore, to set the injection direction of the fuel spray 1303 according to the particular shapes and dimensions of the engine cylinder, cylinder head, and piston.

Although the injection direction of the fuel spray 1303 can be changed according to the particular mounting angle of the fuel injector 1301 with respect to the cylinder head 1308, when the mounting position of the fuel injector is near an air suction port 1310, as shown in FIG. 12, the mounting angle of the fuel injector 1301 needs to be set so that the fuel injector and the air suction port do not interfere with each other.

For the fuel injector of the embodiment described above, the injection direction of the fuel can be adjusted in the direction of the injection hole, independency of the symmetry of the fuel spray. The mounting angle of the fuel injector 1301, therefore, can experience an increased degree of freedom.

Also, the fact that the injection direction of fuel and the symmetry of its spray are independent is useful for avoiding changes in the symmetry of the spray, associated with the change of the injection direction of the fuel injected into the combustion chamber. The symmetry of the spray is an important parameter that affects the distribution of the fuel injected into the combustion chamber and also affects the air-to-fuel ratio of the mixture created near the ignition plug at the ignition timing. It is desirable, therefore, that the symmetry of the spray be set independently of the injection direction of the fuel spray.

As set forth above, for a fuel injector based on the above-described embodiment, it is possible not only to set the injection direction of the fuel spray, independently of the symmetry of the spray, during a relatively simple manufacturing process, but also to adjust only the angle of injection and the distribution of the penetration force among all factors relating to the shape of the spray and thus to provide a desirable fuel injector for an in-cylinder injection-type internal combustion engine.

The use of the fuel injector according to the present invention makes it possible to obtain a spray whose shape is desirable for an in-cylinder injection engine.

The use of the fuel injector according to the present invention enables a spray of a desirable shape to be obtained since, among all factors relating to the shape of the spray, the angle of injection and the distribution of penetration the force can be adjusted.

What is claimed is:

1. A fuel injector equipped with an injection hole for injecting a fuel, and having a swirling force impartment means at an upstream side of said injection hole to impart a swirling force to the fuel, said fuel injector further comprising:
   a means for changing the distribution of said swirling force, which has been imparted by said swirling force impartment means at said upstream side of said injection hole, in a swirling direction of the fuel so that said fuel has a high velocity strong swirling force in one peripheral region of the injection hole and a lower velocity, weaker swirling force in another peripheral region of the injection hole.

2. A fuel injector according to claim 1, characterized in that:
   a valve seat and a valve member for opening and closing a fuel passageway between said injection hole and said valve seat are provided at said upstream side of said injection hole, and
   said means for changing said distribution of said swirling force is provided downstream with respect to said valve seat.

3. A fuel injector according to claim 2, an injection volume measuring portion for minimizing a cross-sectional area of said fuel passageway is provided between said valve seat and said means for changing said distribution of said swirling force.

4. A fuel injector according to claim 1, characterized in that:

said injection hole is provided so that its center line is parallel with respect to the axial center of said valve member, and said means for changing said distribution of said swirling force changes said distribution of said swirling force of the fuel to ensure that the fuel is injected from said injection hole eccentrically with respect to a center line thereof.

5. A fuel injector equipped with an injection hole for injecting a fuel, and having a swirling force impartment means at an upstream side of said injection hole to impart a swirling force to the fuel, said fuel injector further comprising:

a means for changing the distribution of said swirling force, which has been imparted by said swirling force impartment means at said upstream side of said injection hole, in a swirling direction of the fuel, characterized in that:

said injection hole is formed in a first plate-like member, and said means for changing said distribution of said swirling force is formed in a second plate-like member separate from said first plate-like member, and said two plate-like members are laminated.

6. A fuel injector equipped with an injection hole for injecting a fuel, and having a swirling force impartment means at an upstream side of said injection hole to impart a swirling force to the fuel, said fuel injector further comprising:

a means for changing the distribution of said swirling force, which has been imparted by said swirling force impartment means at said upstream side of said injection hole, in a swirling direction of the fuel, characterized in that said means for changing said distribution of said swirling force is constructed using a fuel passageway connected in an eccentric form from the center of the edge at an entrance side of said injection hole.

7. A fuel injector according to claim 6, characterized in that:

said injection hole is provided so as to be inclined with respect to an axial center of said valve member, and a center of said fuel passageway which constitutes said means for changing said distribution of said swirling force is provided in an eccentric form with respect to a line obtained by projecting a central line of said injection hole onto a plane vertical to said axial center.

8. A fuel injector according to claim 6, characterized in that said center of said fuel passageway which constitutes said means for changing said distribution of said swirling force is provided in an eccentric form with respect to said axial center.

9. A fuel injector equipped with an injection hole for injecting a fuel, and having a swirling force impartment means at an upstream side of said injection hole to impart a swirling force to the fuel, said fuel injector further comprising:

a means for changing the distribution of said swirling force, which has been imparted by said swirling force impartment means at said upstream side of said injection hole, in a swirling direction of the fuel, characterized in that:

said injection hole is provided so that its center line is inclined with respect to the axis of said valve member, and said means for changing said distribution of said swirling force changes said distribution of said swirling force of the fuel to ensure that the shape of the spray of fuel injected from said injection hole becomes axially symmetrical.

10. A fuel injector is characterized in that from an upstream side of a fuel passageway, a fuel passageway portion that imparts a swirling force to fuel, a seat portion that is opened and closed by a valve seat and a valve member, and an injection hole portion from which the fuel is injected, are in sequential order, and said fuel passageway portion is located between said seat portion and said injection hole so that a center line of said fuel passageway portion is eccentric with respect to a center of an edge at the entrance side of said injection hole.

11. A fuel injector comprising:

means having an injection hole for injecting fuel and which imparts a swirling force to the fuel from an upstream side of said injection hole;

a valve seat;

a valve member for opening and closing a fuel passageway between said injection hole and said valve seat;

means for driving said valve body; and a swirling force adjustment means for adjusting said swirling force that has been imparted by said swirling force impartment means provided in said fuel passageway which ranges from said valve seat to said injection hole so that said fuel has a high velocity strong swirling force in one peripheral region of the injection hole and a lower velocity, weaker swirling force in another peripheral region of the injection hole.

12. A fuel injector comprising:

means having an injection hole for injecting fuel and which imparts a swirling force to the fuel from an upstream side of said injection hole;

a valve seat;

a valve member for opening and closing a fuel passageway between said injection hole and said valve seat;

means for driving said valve body; and a swirling force adjustment means for adjusting said swirling force that has been imparted by said swirling force impartment means provided in said fuel passageway which ranges from said valve seat to said injection hole, characterized in that:

an injection volume measuring portion for minimizing a cross-sectional area of said fuel passageway is provided between said valve seat and said fuel injector; and said injection volume measuring portion is located upstream with respect to said swirling force adjustment means.

13. A fuel injector according to claim 11 or 12, characterized in that a member with said injector, a member with said swirling force adjustment means, and a member with said valve seat are each provided as an independent member.

14. A fuel injector according to claim 11 or 12, characterized in that said swirling force adjustment means is formed by adopting a structure in which an axial position of said injection hole in a section where said fuel passageway, ranging from said valve seat to said injection hole, is connected thereto can be changed according to a particular circumferential position of said fuel injector.

15. A fuel injector according to claim 14, characterized in that said swirling force adjustment means is formed by providing, in said section where said fuel passageway ranging from said valve seat to said injection hole is connected thereto to enable it to be changed according to said particular circumferential position of said fuel injector, a recessed portion in offset form with respect to an axis of said injection hole.

16. A fuel injector according to claim 11 or 12, characterized in that:

said axis of said injection hole is provided so as to be inclined with respect to an axis of said valve member, and said swirling force adjustment means is provided to adjust said fuel swirling force so that the fuel injected from said injection hole is axially symmetrical with respect to an axis of said injection hole.

17. A fuel injector according to claim 11 or 12, characterized in that:

said axis of said injection hole is provided so as to be parallel to said axis of said valve member, and said swirling force adjustment means is provided to adjust said fuel swirling force so that the fuel is injected from said injection hole in offset form with respect to an axis thereof.

18. A fuel injector equipped with an injection hole, for injecting a fuel, and a valve seat, the fuel injector further comprising:

a fuel passageway in which the fuel is passed through by swirling, said fuel passageway being located at a downstream side of said valve seat, wherein said injection hole is connected at a downstream side of said fuel passageway, and wherein the fuel flown into said injection hole from said fuel passageway has different swirl forces along a peripheral wall of said injection hole so that said fuel has a high velocity strong swirling force in one peripheral region of the injection hole and a lower velocity, weaker swirling force in another peripheral region of the injection hole.

* * * * *